BIPOLAR CURRENT GENERATOR

Filed May 15, 1968 2 Sheets-Sheet 1

INVENTOR.
ARTHUR ROTHBART
BY
Davis, Hoxie, Faithfull & Hapgood
ATTORNEYS

INVENTOR.
ARTHUR ROTHBART
BY
Davis, Hoxie, Faithfull & Hapgood
ATTORNEYS

United States Patent Office 3,555,525
Patented Jan. 12, 1971

3,555,525

BIPOLAR CURRENT GENERATOR

Arthur Rothbart, Bronx, N.Y., assignor to Edo Corporation, College Point, N.Y., a corporation of New York Filed May 15, 1968, Ser. No. 729,205
Int. Cl. G11c *7/00;* H03k *4/48*
U.S. Cl. 340—174 4 Claims

ABSTRACT OF THE DISCLOSURE

A double ended circuit arrangement for driving a magnetostrictive delay line includes an input driving coil connected in a low pass filter construction. Controlled switching elements are provided to direct current in alternating directions through the driving coil, with the current switching transients being exponential in form.

This invention relates to current driver circuits and, more specifically, to a circuit arrangement for impressing a bipolar current of a controlled waveform in a driving coil utilized, for example, to insert information in a magnetostrictive delay line.

An illustrative magnetostrictive delay line, well known in the art, is shown in FIG. 1. The delay line consists of a core 70 having coupled thereto input and output coils 20 and 80 and acoustical absorption terminations 71 and 73. The delay line material 70 (hereinafter called the core) is magnetostrictive, i.e., applied external magnetic fields induce mechanical constricting stresses therein. Once induced, the stresses propagate in the manner of acoustical waves in both directions along the core 70. Since such waves travel relatively slowly at approximately the speed of sound, many electrical digits spaced in the order of microsecond(s) can be packed on even a short line length.

To write a binary digit into the delay line, an input signal source 76 supplies a current pulse to the input winding 20, thereby applying a changing magnetizing field to the local core 70 region within and about the winding. This field produces a mechanical stress in the core, with the stress propagating in both directions therealong. The stress wave moving to the left in FIG. 1 is absorbed by the resistive termination 71 and serves no useful function, the termination 71 being utilized to prevent any undesired signal reflections.

A magnet 74 supplies a quiescent magnetic flux which flows through the core 70 about the output winding 80. When the mechanical stress produced by an input signal arrives at the output winding position, it locally changes the reluctance of the core, thereby also changing the amount of flux therein. This change in flux induces an output signal voltage in the output winding 80 which translates this voltage to an output utilization circuit 77. This output signal is, of course, indicative of the presence of a corresponding input signal, manifested by a current transient in the input winding 20, at some fixed, prior time. The stress wave is then absorbed by the right termination 73. To provide linear operation, as for small signal operation, a magnet 72 is often employed to bias the core 70 about the input winding 20 to a point on its operating stress-applied field characteristic where the mechanical stress, or constriction, varies linearly with the applied external field.

Prior art embodiments for the input driver circuit 76 have typically been of the single ended, unipolar type wherein, in one manner or another, current from a voltage source intermittently passes in one direction only through the input driving coil. The current supplied by the source is thus characterized by significant low frequency energy, with the specific energy distribution varying with the particular digital information being inserted into the delay line. Accordingly, relatively large filters are required to adequately decouple the driver circuit, i.e., to prevent the current switching transients from affecting other circuits connected to the voltage source. Further, since the drive current is applied in one direction only from a quiescent operating point, the magnetostrictive core is used inefficiently from an output signal magnitude standpoint. In particular, the capacity of the core material to be constricted from its quiescent point to saturation in the nondriven direction is not utilized.

Also, double ended, or bipolar input driver circuits 76 have heretofore been employed in conjunction with center-tapped input windings 20 (indicated by the broken line in FIG. 1). In such arrangements, current is selectively driven into either end of the winding 20, and exits from the center tap. Accordingly, only half the coil is used during any digital writing operation, the arrangement thus being inefficient. In addition, any physical imbalance in the center tap vis-a-vis the two winding 20 extremities results in an imbalance in the two oppositely poled output signals.

It is therefore an object of the present invention to provide an improved circuit arrangement for inserting input information in a magnetostrictive delay line.

More specifically, an object of the present invention is the provision of a bipolar, double ended delay line driving circuit which employs relatively low voltages; which dissipates relatively little power; which avoids serious transient decoupling problems; and which symmetrically drives the line in a bipolar mode while avoiding signal imbalance associated with center tapped input transformers.

The above and other objects of the present invention are realized in a specific, illustrative bipolar circuit arrangement for driving a magnetostrictive delay line. The arrangement includes a symmetrical low pass filter section including the input driving winding and two capacitors as series and shunt members thereof. Controlled switching elements are connected in parallel with the capacitors to selectively direct current from a voltage source and an operatively associated one of two circuit resistors in one direction or the other through the input winding.

Input information is inserted in the delay line when the current reverses polarity through the winding under control of the switching elements. The current transient waveform, determined by the filter components and the resistance elements, is exponential in nature and is adapted to prevent successive information digits and influencing one another.

A complete understanding of the present invention, and of the above and other objects, features and advantages thereof may be derived from a consideration of an illustrative embodiment thereof, presented hereinbelow, in conjunction with the accompanying drawing in which.

Figure 1:
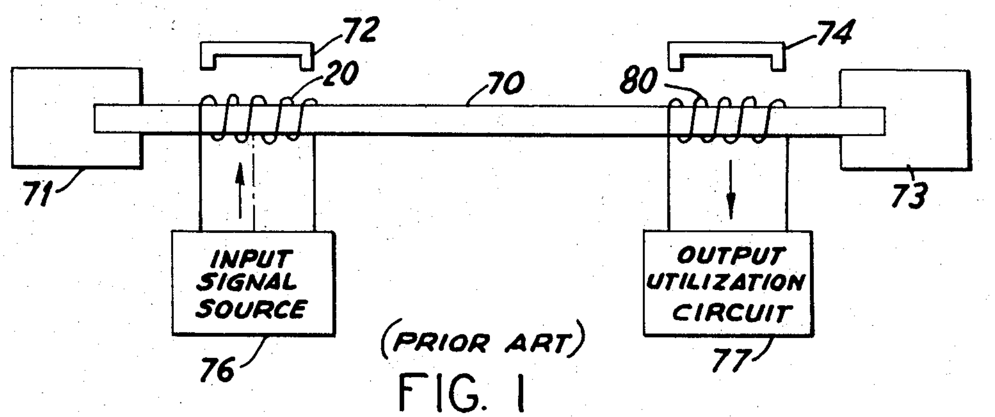
FIG. 1 depicts a prior art magnetostrictive delay line arrangement discussed above.
Figure 2:
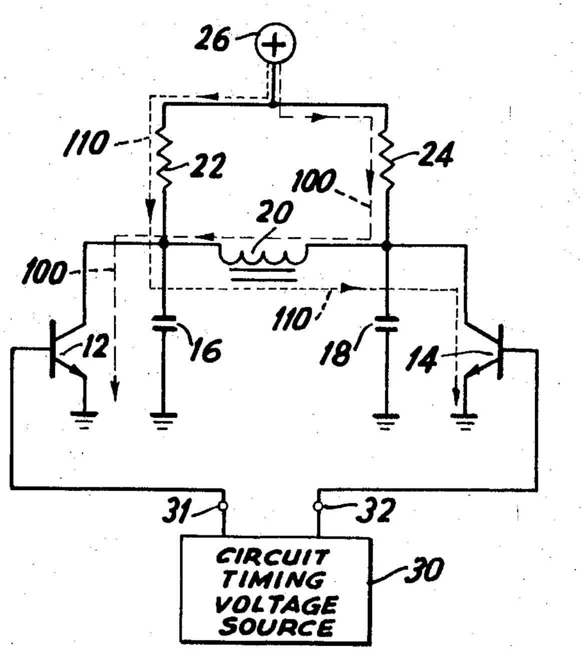
FIG. 2 illustrates an illustrative bipolar delay line input driver circuit illustrating the principles of the present invention.

Referring now to FIG. 2, there is shown an illustrative circuit arrangement for driving an input coil 20 associated with a magnetostrictive delay line, such as considered hereinabove regarding FIG. 1. The arrangement includes capacitors 16 and 18 disposed on either side of the inductive winding 20 to form a symmetrical low pass filter configuration. Two transistors 12 and 14 have their collector-emitter junction paths arranged in parallel with the capacitors 16 and 18, respectively, and the bases of the transistors 12 and 14 are connected to output terminals 31 and 32 of a circuit timing voltage source 30. Finally, the extremities of the coil 20 are connected to a voltage source 26 by two like-valued resistors 22 and 24.

The timing source 30 is adapted to supply one output terminal 31 or 32 with a relatively high voltage; to supply the other output terminal with a relatively low, near ground voltage; and to reverse its potential state from time to time. In particular, the output of the circuit 30 changes state in accordance with the specific digital information to be inserted in the delay line associated with the input winding 20, and also in accordance with the specific coding format being employed. For example, where nonreturn-to-zero coding is utilized, the circuit 30 changes state each time an information digit differs from the preceding digit. For conventional return-to-zero coding, the circuit 30 quiescently resides in a first, or "0" state; attains the alternate state to insert a "1"; continues in its quiescent state to write a "0"; and wherein the source 30 returns to its quiescent "0" condition between digits. The operation of the source 30 for other codings will be readily apparent to one skilled in the art, as will be specific embodiments therefor. For example, the source 30 may comprise a flip-flop of any type, having as the output terminals 31 and 32 the collectors of the two flip-flop transistors (or similar connections to other active elements), and wherein any digital information source drives the flip-flop control lead or leads.

As suggested above for the operation of the magnetostrictive delay line of FIG. 1, the input coil 20 for a magnetostrictive delay line requires two current levels differing by a specific amount, e.g., I amperes, to insert two differing binary representations, or characters, into the delay line. More specifically, the binary "1" and "0" digits can be represented by the presence or absence of a current level switching transient, or by the particular transient polarity as the current alternates between the two levels. To this end, and in the manner described in detail below, the voltage supplied by the source 26 and the resistance of the like elements 22 and 24 are selected such that the quotient of the voltage divided by the resistance is $I/2$ amperes. As will become clear from the discussion below, a first binary state may advantageously be established in the delay line by passing a current of amplitude $I/2$ from right to left through the delay line input winding 20, and the other state effected by passing a current $I/2$ from left to right through the winding 20.

Figure 3A:
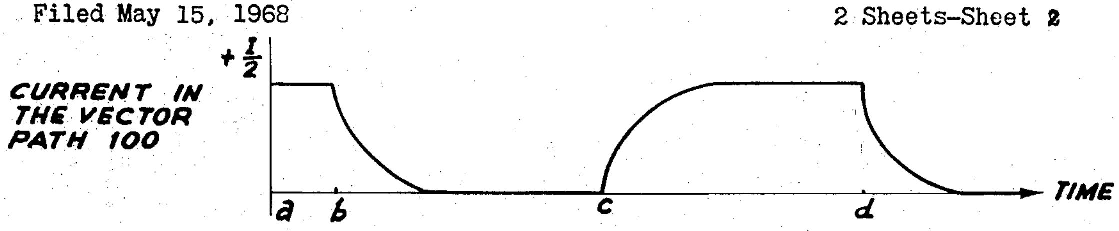
FIGS. 3A through 3E depict current and voltage waveforms associated with selected circuit components illustrated in FIG. 2.
Figure 3B:
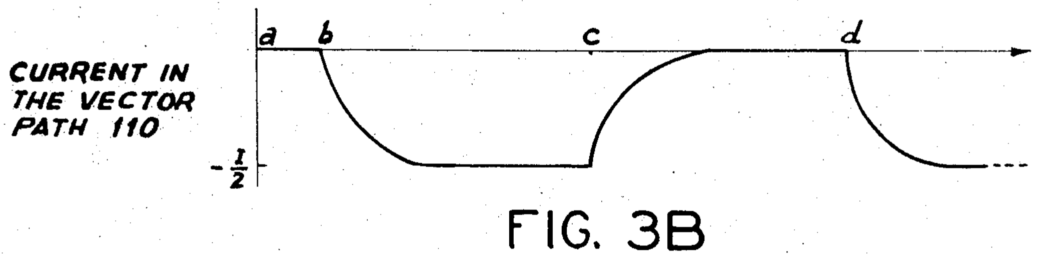

With the above circuit configuration and parameters in mind, an illustrative sequence of operation for the arrangement of FIG. 2 will now be considered. For concreteness, it will be assumed that nonreturn-to-zero coding is utilized; that the last binary digit encountered was a "1"; and that the timing source 30 output terminals 31 and 32 are in their high and low voltage states at the time *a* and the interval therefollowing shown in the timing diagrams of FIGS. 3A through 3E. The relatively high voltage at the output terminal 31 renders the transistor 12 conductive. Conversely, the base of the transistor 14 is not energized, and the element 14 is nonconductive. Accordingly, after steady state is reached, a current of magnitude $I/2$ flows from right to left in the delay line input coil 20 following the dashed path 100 of FIG. 2. This current state is shown for the interval following time *a* in FIGS. 3A and 3C.

Assume now that a binary "0" is to be inserted in the delay line at the time *b* shown in FIGS. 3A through 3E. The timing source 30 responds to the binary "0" digit by reversing its voltage state, with its output terminals 31 and 32 respectively exhibiting relatively low and high potentials. This is depicted for the interval *b–c* in FIGS. 3D and 3E.

Figure 4:
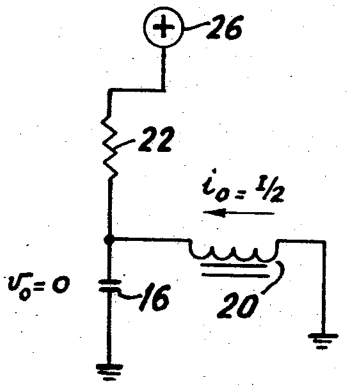
FIGS. 4 and 5 illustrate subportions of the arrangement of FIG. 2 operative for selected transient conditions.
Figure 3C:
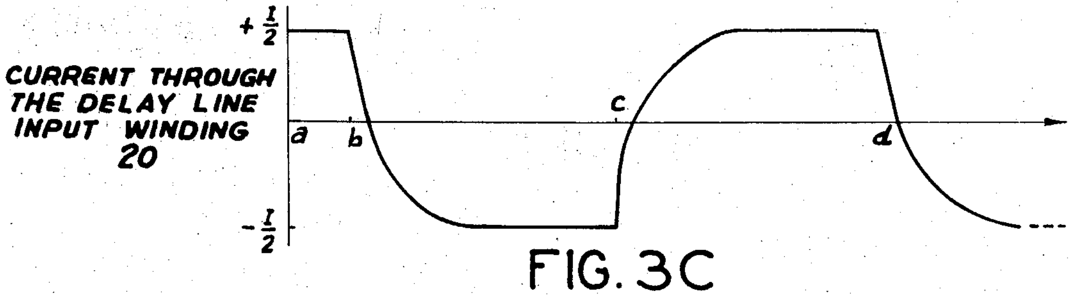
Figure 3D:
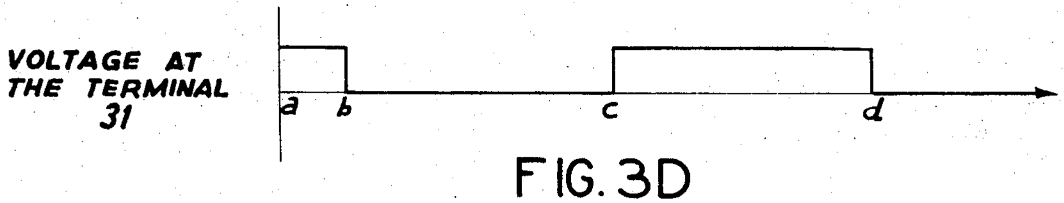
Figure 3E:
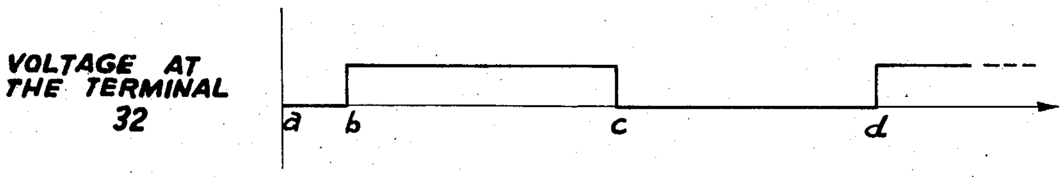

The transistors 12 and 14 quickly respond to the changed outputs of the source 30 by respectively becoming nonconductive and conductive, thereby effectively presenting very high and very low impedances to the circuit elements connected thereto. Accordingly, with the transistors 12 and 14 so selectively energized, the FIG. 2 coil driving circuit reduces, for purposes of transient analysis, to the configuration depicted in FIG. 4 where, as initial conditions, a current $I/2$ flows to the left in the input coil 20, and the capacitor 16 is initially uncharged. By suitably selecting parameters for the circuit components 16, 20 and 22 such that the composite circuit is not underdamped, the current through the coil 20 will change exponentially from $I/2$ in a left to right direction to a new, right to left polarity, also of value $I/2$. This is illustrated in FIG. 3C following the time *b* (see also FIGS. 3A and 3B for replicas of the currents in the paths 100 and 110 of FIG. 2). There is no circuit ringing, and the switching current transient abates completely before the next information digit is permitted to come along, this maximum signal repetition rate being dependent upon the bandwidth of the delay line. Thus, there is no cross talk and the successive digits are isolated and have no effect upon one another.

The exponential current transient in the winding 20 induces a corresponding change in the mechanical stress in the magnetostrictive delay line coupled thereto. When this stress propagates down the line to the output winding position, the changed magnetic reluctance induces a voltage in the output winding of a specific "0" indicating polarity which is supplied to an output utilization means.

Figure 5:
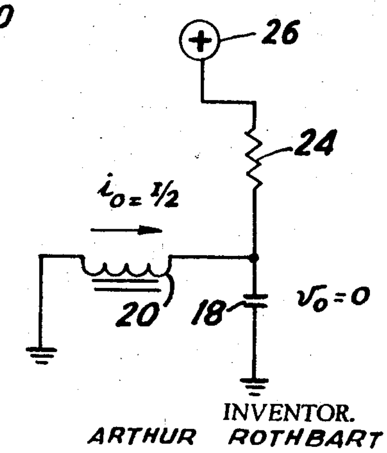

At some subsequent time, e.g., at the time C in FIGS. 3A through 3E, assume that a binary "1" digit appears for processing. The source 30 thus energizes the terminal 31 (FIG. 3D) and not the terminal 32 (FIG. 3E), thus open circuiting the transistor 14 and effectively short circuiting the device 12. The operative configuration is thus as shown in FIG. 5 with the initial conditions there indicated. For this case, in a manner analogous to that described above for circuit operation following the time *b*, the current through the delay line input winding 20 (FIG. 3C) will reverse directions, and will change exponentially from a value $I/2$ to the right to $I/2$ to the left. This, in turn, induces a mechanical stress change in the magnetostrictive delay line of a magntitude which is the same as for the above considered, "0" write case, but of an opposite sense. After a fixed delay, this stress perturbation reaches the output coil and induces a voltage of the "1" sense therein.

Thus, the bipolar current driver circuit arrangement of FIG. 2 has been shown by the above to be capable of inserting binary "1" or "0" digits into a magnetostrictive delay line using a nonreturn-to-zero code. As will be apparent to one skilled in the art any other coding may be employed, simply using the two stable current states, viz. $I/2$ amps flowing to the right or to the left, and/or the two oppositely-poled transients between these current levels, to reflect the requisite two binary states.

In the actual practice of delay line driving circuits, the difference in current between the two stable current states (I amperes above) is fixed by output signal requirements. Also, the values of other circuit elements are fixed, or at least of restricted choice, in view of bandwidth, cross talk, interdigit isolation, or similar requirements. Accordingly, in prior art unipolar driver circuits, a voltage source larger than that used in the FIG. 2 arrangement is required to generate any given output signal magnitude. Accordingly, the FIG. 2 arrangement, in using a smaller source, is more efficient and consumes significantly less power than is required for prior, single ended arrangements. Moreover, since only smaller voltages are employed throughout the circuit, the arrangement of FIG. 2 is more conducive to microcircuit fabrication. Also, since the transients in the current output of the source 26 are characterized by relatively high frequency components only, less filtering for decoupling is required. Further, larger output signals are available with the bipolar driver arrangement of FIG. 2. In particular, the $\pm I/2$ signal currents can drive the magnetostrictive delay line through any desired portion or all of its useful operating characteristic between saturation conditions for each digital signal. Conversely, for the unipolar driver case, only the range between zero signal and saturation in one direction can be used.

It is to be understood that the above-described arrangement is only illustrative of the principles of the present invention. Numerous modifications and adaptations thereof will be readily apparent to those skilled in the art without departing from the spirit and scope of the present invention. For example, the double-ended driver circuit of FIG. 1 can be operated in a bipolar signal mode in cooperation with the nontapped input coil 20. More specifically, neither of the transistors 12 nor 14 is energized by the circuit 30 when neither a "0" nor "1" signal is being recorded. To write a "1," only one of the devices 12 or 14 is turned on, and a "0" is written by rendering conductive only the alternate transistor 12 or 14.

What is claimed is:

1. In combination in a bipolar circuit configuration for driving a magnetic field responsive device, a driving coil having a first and second end, two capacitors connected to differing ends of said coil for determining the transient current waveform flowing between said coil ends, first and second controlled switch means each including selective conducting means connected in parallel with a different one of said capacitors, a voltage source, two resistors each serially connecting said voltage source with a different end of said coil, and means for selectively rendering a selected one of said switching means conductive and for rendering the other of said switching means nonconductive, said coil being energized by a current path comprising said voltage source, said resistor connected to said coil end remote from said conducting switch means, said coil between its said first and second ends, and said conducting switch.

2. A combination as in claim 1 wherein said first and second controlled switch means comprise first and second transistors.

3. In combination in a bipolar circuit arrangement for driving a magnetostrictive delay line input coil, a symmetrical low pass filter including said input coil, a voltage source, first gated means including a first series resistance for selectively supplying current from said source in a first direction through said coil, second gated means including a second series resistance for selectively supplying current from said source in a second direction through said coil, and means for alternately gating said first and second gating means.

4. A combination as in claim 3 wherein said low pass filter comprises a symmetrical section having two capacitors each connected to a different end of said input coil.

References Cited

UNITED STATES PATENTS

| | | | |
|---|---|---|---|
| 3,174,050 | 3/1965 | Brewster et al. | 307—88 |
| 3,344,321 | 9/1967 | Sumilas | 307—270X |
| 3,377,518 | 4/1968 | Radcliffe | 307—270X |

STANLEY M. URYNOWICZ, Jr., Primary Examiner

U.S. Cl. X.R.

317—148.5; 307—270, 253